(12) United States Patent
Okamoto

(10) Patent No.: US 9,004,108 B2
(45) Date of Patent: Apr. 14, 2015

(54) SOLENOID VALVE CONTROL DEVICE

(71) Applicant: SMC Kabushiki Kaisha, Chiyoda-ku (JP)

(72) Inventor: Masaya Okamoto, Ryugasaki (JP)

(73) Assignee: SMC Kabushiki Kaisha, Chiyoda-ku (JP)

( * ) Notice: Subject to any disclaimer, the term of this patent is extended or adjusted under 35 U.S.C. 154(b) by 119 days.

(21) Appl. No.: 13/943,030

(22) Filed: Jul. 16, 2013

(65) Prior Publication Data
US 2014/0048162 A1 Feb. 20, 2014

(30) Foreign Application Priority Data

Aug. 20, 2012 (JP) ................. 2012-181309

(51) Int. Cl.
*F16K 31/06* (2006.01)
*H01F 7/06* (2006.01)

(52) U.S. Cl.
CPC ................ *F16K 31/06* (2013.01); *H01F 7/064* (2013.01)

(58) Field of Classification Search
CPC .................................... F15B 13/0867
USPC ........................ 137/884; 700/282
See application file for complete search history.

(56) References Cited

U.S. PATENT DOCUMENTS

| 4,007,028 | A | * | 2/1977 | Bublitz et al. | .................. 65/163 |
| 5,458,048 | A | * | 10/1995 | Hohner | ........................... 91/459 |
| 5,519,636 | A | | 5/1996 | Stoll et al. | |
| 6,206,045 | B1 | * | 3/2001 | Hayashi et al. | ............... 137/884 |
| 6,382,257 | B2 | * | 5/2002 | Mead et al. | .................. 137/884 |
| 7,127,885 | B2 | * | 10/2006 | Mundry et al. | ................. 60/368 |
| 7,690,398 | B2 | * | 4/2010 | Kuhbauch | ..................... 137/884 |
| RE41,299 | E | * | 5/2010 | Atkin et al. | ............. 137/315.01 |
| 7,881,828 | B2 | * | 2/2011 | Schmidt | ....................... 700/282 |
| 7,967,646 | B2 | * | 6/2011 | De Carolis et al. | ........... 439/717 |
| 2002/0004343 | A1 | | 1/2002 | Morikawa | |

FOREIGN PATENT DOCUMENTS

| JP | 6-123374 | 5/1994 |
| JP | 2002-23808 | 1/2002 |
| JP | 2003-139264 | 5/2003 |
| JP | 2003-140703 | 5/2003 |

* cited by examiner

*Primary Examiner* — John Fox
(74) *Attorney, Agent, or Firm* — Oblon, McClelland, Maier & Neustadt, L.L.P.

(57) ABSTRACT

In a solenoid valve control device, a plurality of solenoid valve blocks are connected in series with respect to a solenoid valve control unit. A solenoid valve operating circuit of a given solenoid valve block, to which a block selection signal from a block selection line is supplied, operates plural solenoid valves of the same given block, based on the block selection signal.

3 Claims, 2 Drawing Sheets

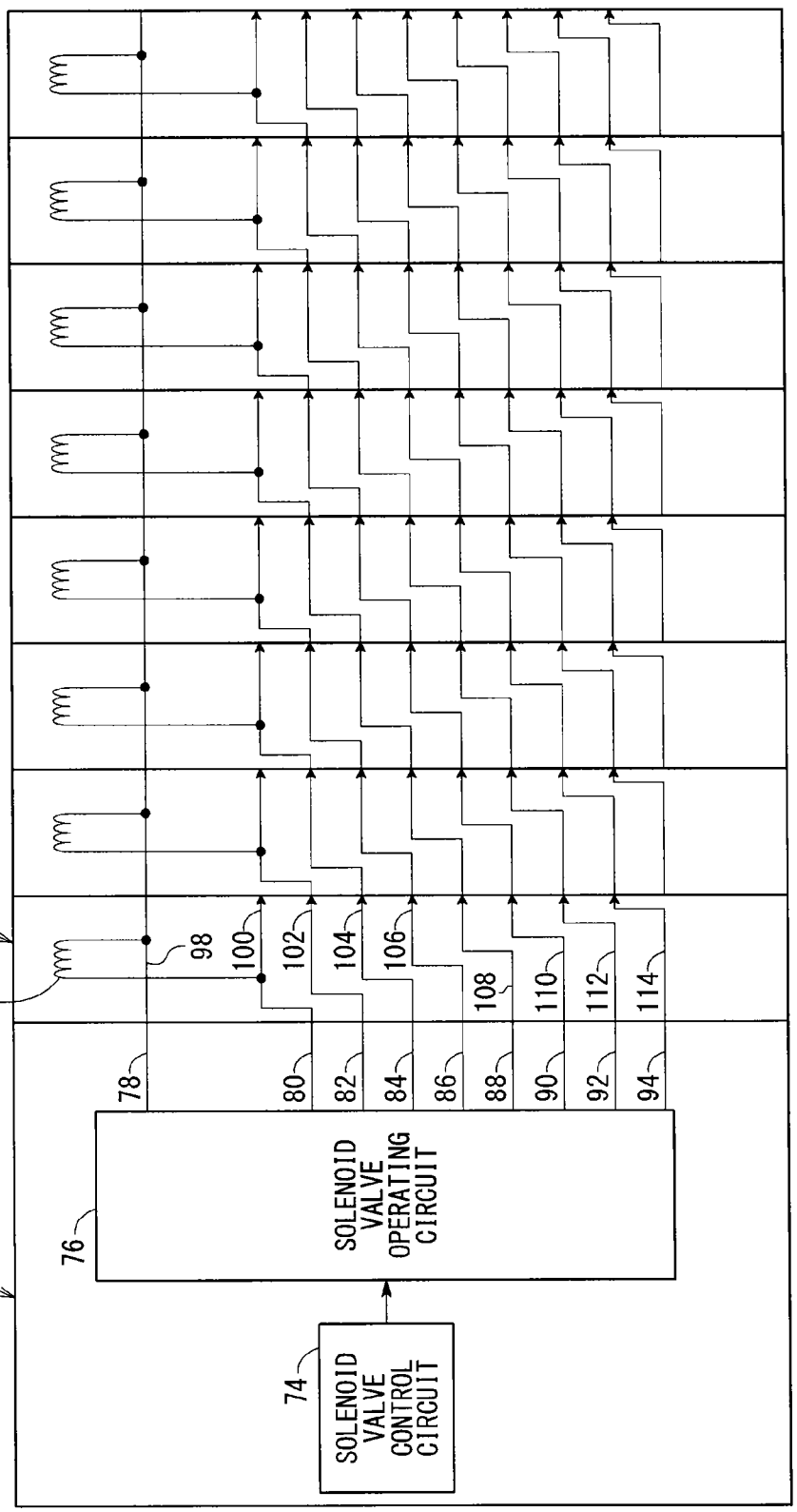

SOLENOID VALVE CONTROL DEVICE

CROSS-REFERENCE TO RELATED APPLICATION

This application is based upon and claims the benefit of priority from Japanese Patent Application No. 2012-181309 filed on Aug. 20, 2012, the contents of which are incorporated herein by reference.

BACKGROUND OF THE INVENTION

1. Field of the Invention

The present invention relates to a solenoid valve control device for controlling a plurality of solenoid valves.

2. Description of the Related Art

In Japanese Laid-Open Patent Publication No. 06-123374, Japanese Laid-Open Patent Publication No. 2002-023808, Japanese Laid-Open Patent Publication No. 2003-139264, and Japanese Laid-Open Patent Publication No. 2003-140703, solenoid valve control devices are disclosed for controlling a plurality of solenoid valves.

According to Japanese Laid-Open Patent Publication No. 06-123374, plural conversion circuits are connected in series, which convert control signals from serial signals into parallel signals. The converted parallel signals are supplied to solenoid valves for controlling the solenoid valves.

According to Japanese Laid-Open Patent Publication No. 2002-023808, Japanese Laid-Open Patent Publication No. 2003-139264, and Japanese Laid-Open Patent Publication No. 2003-140703, a plurality of solenoid valve units are connected and provided in the form of a manifold. Control signals are supplied via parallel communications to each of the connected solenoid valve units, for thereby controlling a solenoid valve of each of the solenoid valve units.

SUMMARY OF THE INVENTION

In the foregoing manner, in the case that control signals are supplied by parallel communications to each of the solenoid valves, signal lines are needed that are the same in number as the solenoid valves. As a result, if it is attempted to control a large number of solenoid valves, the number of required signal lines increases significantly.

On the other hand, in the event that plural conversion circuits are connected in series and serial signals are converted into parallel signals by each of the conversion circuits, all of the conversion circuits are arranged on one individual signal line and serial signals are supplied to the conversion circuits. Thus, until serial signals first reach the most downstream conversion circuit, subsequent serial signals cannot be transmitted. As a result, response delays occur in relation to controlling the solenoid valves.

The present invention, in order to solve the aforementioned problems, is an improvement of the techniques disclosed in Japanese Laid-Open Patent Publication No. 06-123374, Japanese Laid-Open Patent Publication No. 2002-023808, Japanese Laid-Open Patent Publication No. 2003-139264, and Japanese Laid-Open Patent Publication No. 2003-140703. More specifically, the present invention has an object of providing a solenoid valve control device which suppresses an increase in the number of signal lines, while also enabling a greater number of solenoid valves to be controlled, together with improving response characteristics in relation to control of the solenoid valves.

A solenoid valve control device according to the present invention is equipped with a plurality of solenoid valve blocks arranged in the form of a manifold, and a solenoid valve control unit for controlling the solenoid valve blocks, wherein the solenoid valve blocks are connected to the solenoid valve control unit.

In addition, preferably, to achieve the aforementioned objects, the solenoid valve control unit and the solenoid valve blocks are configured in the following manner.

The solenoid valve control unit includes a power source supply line for performing supply of power to the solenoid valve blocks, a serial communication line for carrying out serial communications among the solenoid valve blocks, and block selection lines provided in the same number as the solenoid valve blocks.

On the other hand, each of the solenoid valve blocks includes a plurality of solenoid valves, a solenoid valve operating circuit that operates the solenoid valves, and transfer lines. The solenoid valve operating circuit of each of the solenoid valve blocks is connected to any one of the block selection lines via one of the transfer lines within the same block.

In this case, the solenoid valve control unit supplies a block selection signal for selecting a given solenoid valve block to be controlled, to the solenoid valve operating circuit of the given solenoid valve block to be controlled, via any one of the block selection lines and the transfer lines for the given solenoid valve block to be controlled, which are connected to the one of the block selection lines. Thus, based on the block selection signal, the solenoid valve operating circuit to which the block selection signal is supplied operates the plurality of solenoid valves that are connected to that solenoid valve operating circuit.

In this manner, according to the present invention, the solenoid valve operating circuit is installed in each of the solenoid valve blocks, in each of which the plurality of solenoid valves are arranged in the form of a manifold. As a result, the solenoid valves and the solenoid valve operating circuits are arranged as individual blocks. Owing thereto, with the present invention, an increase in the number of signal lines (serial communication lines, block selection lines) can be suppressed, and a greater number of solenoid valves can be controlled.

More specifically, each of the block selection lines is connected to the transfer lines for any one of the solenoid valve blocks. In this case, if a block selection signal is supplied from the solenoid valve control unit to the solenoid valve operating circuit of the one solenoid valve block via one of the transfer lines and one of the block selection lines, all of the solenoid valves that are connected to the concerned solenoid valve operating circuit can be operated thereby. Further, if one additional block selection line is added for each connected solenoid valve block, the solenoid valve blocks can easily be controlled from the solenoid valve control unit.

As a result, even if the number of solenoid valves to be controlled is significantly increased, because the number of signal lines does not have to be increased to the same degree, ease of assembly of the solenoid valve blocks can be enhanced.

Further, with the present invention, since it is possible to control only the plural solenoid valves that are connected to the solenoid valve operating circuit of the solenoid valve block to which the block selection signal is supplied, compared to the technique of Japanese Laid-Open Patent Publication No. 06-123374, responsiveness of the plural solenoid valves can easily be improved.

The solenoid valve blocks preferably are connected in series with respect to the solenoid valve control unit, and each of the solenoid valve blocks includes the same number of transfer lines as the number of block selection lines. In this case, the block selection lines preferably are arranged along a direction transverse to the connection direction of the solenoid valve blocks, and the transfer lines of each of the solenoid valve blocks are arranged along the direction transverse to the connection direction, such that a downstream side of each transfer line in the connection direction is shifted stepwise by one line along the transverse direction with respect to an upstream side thereof in the connection direction.

In addition, the transfer lines of a first solenoid valve block adjacent to the solenoid valve control unit in the connection direction preferably are connected to the respective block selection lines, and the transfer lines of each of second and subsequent solenoid valve blocks in the connection direction preferably are connected to the respective transfer lines of an adjacent solenoid valve block on an upstream side in the connection direction, and to the respective transfer lines of an adjacent solenoid valve block on a downstream side in the connection direction.

In the foregoing manner, the solenoid valve blocks have substantially the same structure, and the block selection lines and the transfer lines are arranged in a so-called windowblinds like configuration. Owing thereto, when the solenoid valve blocks are connected sequentially along the connection direction with respect to the solenoid valve control unit, the block selection lines and the transfer lines are connected appropriately. Consequently, ease of assembly of the solenoid valve blocks is further improved. Further, since the solenoid valve blocks have substantially the same structure, an operator is capable of assembling (connecting) the solenoid valve blocks without any consideration as to the order in which the solenoid valve blocks are connected.

Further, the transfer lines of each of the solenoid valve blocks are arranged such that a downstream side of each transfer line in the connection direction is shifted stepwise by one line along the transverse direction with respect to an upstream side thereof in the connection direction. For this reason, in actuality, in the event that the solenoid blocks are connected in series, between the upstream one and the downstream one of the adjacent solenoid valve blocks, transfer lines of a number (equal to the full number of the transfer lines of each block minus one) are connected.

Additionally, each of the solenoid valve blocks further includes a block-side power source line and a block-side communication line. In this case, the solenoid valve operating circuit of each of the solenoid valve blocks is connected to the block-side power source line and the block-side communication line of the same block. Further, the block-side power source lines of the solenoid valve blocks are connected sequentially to the power supply line along the connection direction. Furthermore, the block-side communication lines of the solenoid valve blocks are connected sequentially to the serial communication line along the connection direction.

Accordingly, when the solenoid valve blocks are connected in series with respect to the solenoid valve control unit in the connection direction, all of the signal lines pertaining to supply of power are connected in series, all of the signal lines pertaining to serial communications are connected in series, and all of the signal lines pertaining to transmission of the block selection signals are connected in series. As a result, ease of assembly of the solenoid valve blocks can be further enhanced, and as for the device overall, a greater number of solenoid valves can be controlled with a fewer number of signal lines.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a circuit diagram of a solenoid valve control device according to a comparative example.

DESCRIPTION OF THE PREFERRED EMBODIMENTS

Figure 1:
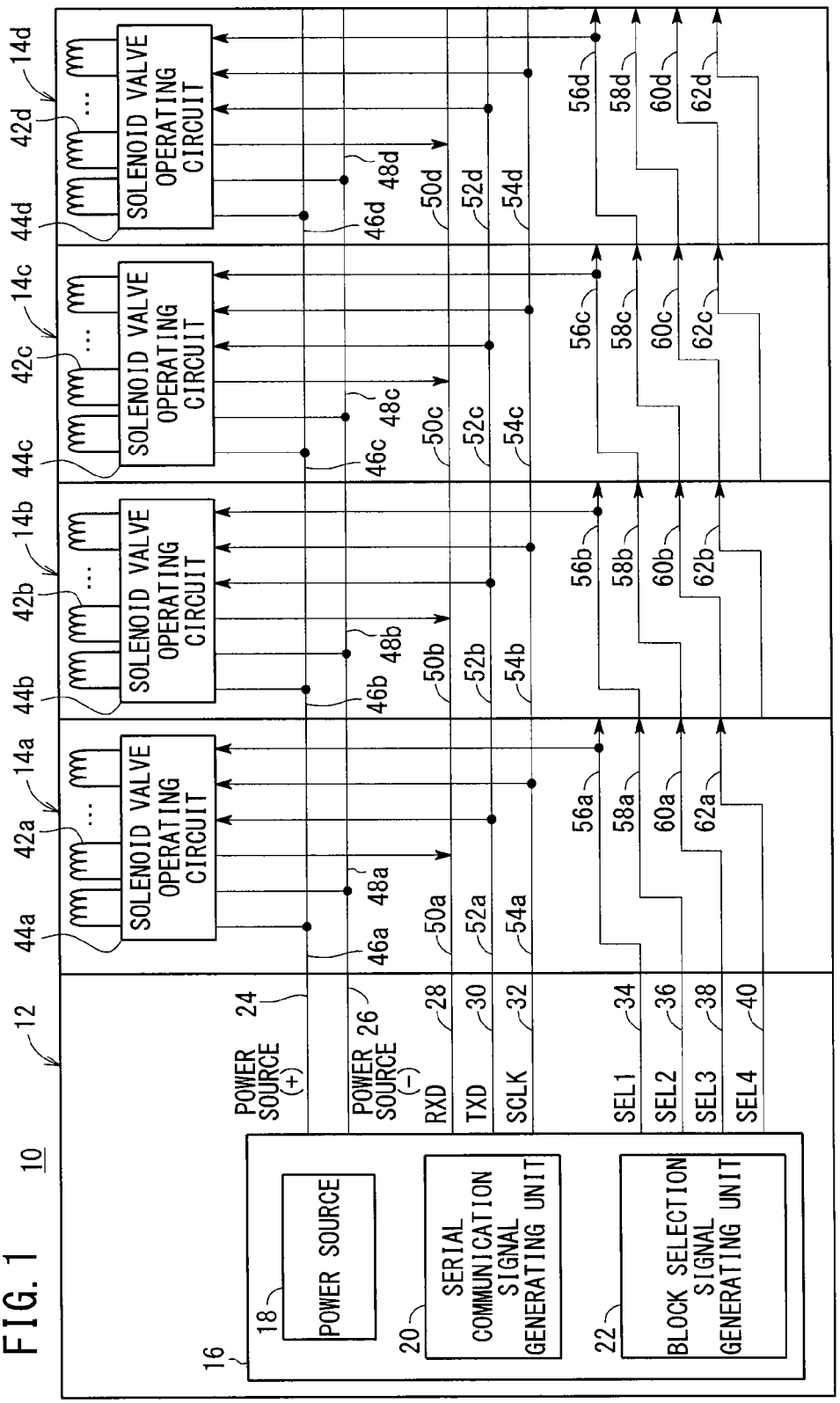
FIG. 1 is a circuit diagram of a solenoid valve control device according to the present embodiment.

A preferred embodiment of a solenoid valve control device according to the present invention will be described in detail below with reference to the drawings.

[Configuration of the Present Embodiment]

As shown in FIG. 1, a solenoid valve control device 10 according to the present embodiment comprises a solenoid valve control unit 12, and a plurality of solenoid valve blocks 14a to 14d, which are connected in series in a lateral direction (connection direction) in FIG. 1 with respect to the solenoid valve control unit 12.

FIG. 1 illustrates, as an example, a case in which four solenoid valve blocks 14a to 14d, which are arranged in the form of a manifold, are connected together in series along the connection direction. The present embodiment is not limited to the arrangement shown in FIG. 1, and one to three solenoid valve blocks 14a to 14c may be connected in series, or alternatively, five or more solenoid valve blocks may be connected in series.

The solenoid valve control unit 12 operates to control a plurality of solenoid valve blocks 14a to 14d, and has a solenoid valve control circuit 16 including a power source 18, a serial communication signal generating unit 20, and a block selection signal generating unit 22.

The power source 18 performs supply of power to the solenoid valve blocks 14a to 14d via power supply lines 24, 26. The power supply line 24 is a positive polarity power source line, whereas the power supply line 26 is a negative polarity power source line (e.g., a ground line).

The serial communication signal generating unit 20 carries out transmission and receipt of signals by way of serial communications between the solenoid valve blocks 14a to 14d via serial communication lines 28 to 32. The serial communication line 28 is a signal line (RXD) for receiving reception data (e.g., operation results of solenoid valves 42a to 42d) that is transmitted from the respective solenoid valve blocks 14a to 14d. The serial communication line 30 is a signal line (TXD) for transmitting transmission data (e.g., control signals for operating the solenoid valves 42a to 42d) to the respective solenoid valve blocks 14a to 14d from the serial communication signal generating unit 20. The serial communication line 32 is a signal line (SCLK) for transmitting a serial clock pulse to the solenoid valve blocks 14a to 14d from the serial communication signal generating unit 20.

The block selection signal generating unit 22 generates block selection signals (SEL1 to SEL4) for selecting a given solenoid valve block to be controlled, from among the solenoid valve blocks 14a to 14d that are connected in series to the solenoid valve control unit 12. The solenoid valve control unit 12 includes block selection lines 34 to 40, which are the same in number as the number of solenoid valve blocks 14a to 14d that are connected in series with respect to the solenoid valve control unit 12.

The block selection lines 34 to 40 are allocated respectively to the solenoid valve blocks 14a to 14d, and are arranged along a direction transverse to the aforementioned connection direction (i.e., a transverse direction that extends vertically in FIG. 1). In this case, the block selection signal generating unit 22 outputs block selection signals to given solenoid valve blocks 14a to 14d to be controlled, respectively via the block selection lines 34 to 40 that are allocated respectively to the solenoid valve blocks 14a to 14d to be controlled.

The solenoid valve blocks 14a to 14d, which are provided in the form of a manifold, are substantially the same in structure.

More specifically, each of the solenoid valve blocks 14a to 14d includes a plurality of solenoid valves 42a to 42d, a solenoid valve operating circuit 44a to 44d that operates the solenoid valves 42a to 42d, block-side power source lines 46a to 46d and 48a to 48d connected to the respective power supply lines 24, 26, block-side communication lines 50a to 50d, 52a to 52d, and 54a to 54d connected to the respective serial communication lines 28 to 32, and transfer lines 56a to 56d, 58a to 58d, 60a to 60d, and 62a to 62d connected to the corresponding block selection line 34 to 40.

The solenoid valve operating circuits 44a to 44d are connected to the respective block-side power source lines 46a to 46d and 48a to 48d, to the respective block-side communication lines 50a to 50d, 52a to 52d, and 54a to 54d, and to the respective transfer lines 56a to 56d.

In the foregoing manner, the solenoid valve blocks 14a to 14d have substantially the same structure. Owing thereto, when the solenoid valve blocks 14a to 14d are connected in series with respect to the solenoid valve control unit 12, as shown in FIG. 1, the block-side power source lines 46a to 46d are connected in series with the power supply line 24, and the block-side power source lines 48a to 48d are connected in series with the power supply line 26. Further, the block-side communication lines 50a to 50d are connected in series with the serial communication line 28, the block-side communication lines 52a to 52d are connected in series with the serial communication line 30, and the block-side communication lines 54a to 54d are connected in series with the serial communication line 32.

Furthermore, in each of the solenoid valve blocks 14a to 14d, the transfer lines (i.e., 56a, 58a, 60a, and 62a in the block 14a; 56b, 58b, 60b, and 62b in the block 14b; 56c, 58c, 60c, and 62c in the block 14c; and 56d, 58d, 60d, and 62d in the block 14d) whose number is the same as the number of the block selection lines 34 to 40, are arranged along the aforementioned transverse direction.

In this case, the transfer lines 56a to 56d, 58a to 58d, 60a to 60d, 62a to 62d are configured such that a downstream side of each transfer line (the right side in FIG. 1) in the connection direction is shifted stepwise by one line along the transverse direction with respect to an upstream side thereof (the solenoid valve control unit 12 side, i.e., the left side in FIG. 1) in the connection direction.

For this reason, when the solenoid valve blocks 14a to 14d are connected in series with respect to the solenoid valve control unit 12, the block selection lines 34 to 40 are connected respectively to the transfer lines 56a to 56d which are connected respectively to the solenoid valve operating circuits 44a to 44d of the solenoid valve blocks 14a to 14d to which the respective transfer lines 56a to 56d are assigned.

More specifically, the block selection line 34 is connected to the transfer line 56a that is connected to the solenoid valve operating circuit 44a, and functions as a signal line for selecting the solenoid valve block 14a.

The block selection line 36 is connected, via the transfer line 58a, to the transfer line 56b that is connected to the solenoid valve operating circuit 44b, and functions as a signal line for selecting the solenoid valve block 14b.

The block selection line 38 is connected, via the transfer lines 60a and 58b, to the transfer line 56c that is connected to the solenoid valve operating circuit 44c, and functions as a signal line for selecting the solenoid valve block 14c.

The block selection line 40 is connected, via the transfer lines 62a, 60b, and 58c, to the transfer line 56d that is connected to the solenoid valve operating circuit 44d, and functions as a signal line for selecting the solenoid valve block 14d.

Stated otherwise, in the present embodiment, the downstream side of each of the transfer lines 56a to 56d, 58a to 58d, 60a to 60d, and 62a to 62d is shifted stepwise by one line in the transverse direction. Owing thereto, the transfer lines 56a to 56d, 58a to 58d, 60a to 60d, and 62a to 62d are connected in a stepwise manner, so that block selection signals can be transmitted between the block selection lines 34 to 40 and the solenoid valve operating circuits 44a to 44d. Further, by being shifted stepwise by one line, between two adjacent solenoid valve blocks, transfer lines of a certain number (equal to the full number of the transfer lines of each block itself minus one) are mutually connected.

[Operations of the Present Embodiment]

The solenoid valve control device 10 according to the present embodiment is constructed basically as described above. In the solenoid valve control device 10, one or more of the solenoid valve blocks 14a to 14d to be controlled are selected on the side of the solenoid valve control unit 12, and in the case that solenoid valves 42a to 42d of the selected solenoid valve blocks 14a to 14d are desired to be controlled, the solenoid valve control device 10 operates as described below.

The power source 18 initially carries out supply of power to the solenoid valve operating circuits 44a to 44d via the power supply lines 24, 26 and the block-side power source lines 46a to 46d, 48a to 48d. As a result, the solenoid valve operating circuits 44a to 44d are placed in a condition where they can immediately be operated in the event that signals are input thereto from the side of the solenoid valve control unit 12.

Next, the serial communication signal generating unit 20 generates control signals and clock pulse signals for controlling the solenoid valves 42a to 42d. The generated control signals are transmitted to the solenoid valve operating circuits 44a to 44d via the serial communication line 30 and the block-side communication lines 52a to 52d. Further, the generated clock pulse signals are transmitted to the solenoid valve operating circuits 44a to 44d via the serial communication line 32 and the block-side communication lines 54a to 54d.

In such a condition, the block selection signal generating unit 22 selects one or more of the solenoid valve blocks 14a to 14d to be controlled, and generates block selection signals for instructing operating of the solenoid valves 42a to 42d of the selected solenoid valve blocks 14a to 14d. The generated block selection signals are transmitted from the block selection line 34 to 40, which are connected respectively to the solenoid valve blocks 14a to 14d, to the solenoid valve operating circuits 44a to 44d of the concerned solenoid valve blocks 14a to 14d, via the corresponding transfer lines 56a to 56d, 58a to 58d, 60a to 60d, and 62a to 62d.

Based on the block selection signals, the solenoid valve operating circuits 44a to 44d that have received the block selection signals, recognize the solenoid valves 42a to 42d of their own blocks as objects to be controlled. Thereafter, using the control signals and the serial clock pulses, which are supplied from the serial communication signal generating unit 20, the concerned solenoid valve operating circuits 44a to 44d control operating of the solenoid valves 42a to 42d of their own blocks. In this case, the concerned solenoid valve operating circuits 44a to 44d convert the control signals from serial signals into parallel signals, and using the converted parallel signals, control operating of the solenoid valves 42a to 42d of their own blocks.

The operation control results are transmitted to the solenoid valve control circuit 16 via the block-side communication lines 50a to 50d and the serial communication line 28. As a result, with the solenoid valve control unit 12, based on the received operation control results, it can easily be confirmed whether or not the solenoid valves 42a to 42d of the solenoid valve blocks 14a to 14d to be controlled are being controlled appropriately based on the block selection signals.

Moreover, the solenoid valve blocks 14a to 14d to be controlled, which are selected in the solenoid valve control unit 12, may be any individual solenoid valve block, or may be two or more or all of the solenoid valve blocks. With the present embodiment, in any case, only solenoid valves 42a to 42d of solenoid valve blocks 14a to 14d that are supplied with block selection signals can be controlled for operation.

Accordingly, as for solenoid valve blocks to which the block selection signals are not supplied, even if supply of the control signals and serial clock pulses from the serial communication signal generating unit 20, or supply of power from the power source 18 takes place, the solenoid valves of the solenoid valve blocks cannot be operated.

Further, according to the present embodiment, the number of solenoid valves 42a to 42d, operating of which is controlled by an individual one of the solenoid valve operating circuits 44a to 44d, is set appropriately. For example, eight individual solenoid valves 42a to 42d can be allocated to each of the individual solenoid valve operating circuits 44a to 44d. In this case, for the solenoid valve control device 10 as a whole, thirty-two individual solenoid valves 42a to 42d are capable of being operated.

[Effects of the Present Embodiment]

Next, effects of the solenoid valve control device 10 according to the present embodiment will be described in comparison with the devices disclosed in Japanese Laid-Open Patent Publication No. 06-123374, Japanese Laid-Open Patent Publication No. 2002-023808, Japanese Laid-Open Patent Publication No. 2003-139264, and Japanese Laid-Open Patent Publication No. 2003-140703.

FIG. 2 is a circuit diagram of a solenoid valve control device 68 according to a comparative example, in which there is shown schematically the configuration of a solenoid valve control device according to Japanese Laid-Open Patent Publication No. 06-123374, Japanese Laid-Open Patent Publication No. 2002-023808, Japanese Laid-Open Patent Publication No. 2003-139264, and Japanese Laid-Open Patent Publication No. 2003-140703.

In the comparative example, a plurality (eight as shown in FIG. 2) of solenoid valve units 72 configured in the form of a manifold are connected in series with respect to a solenoid valve control unit 70.

In this case, a solenoid valve control circuit 74 and a solenoid valve operating circuit 76 are incorporated in the solenoid valve control unit 70, and a common line 78 and signal lines 80 to 94, which are the same in number as the number of solenoid valve units 72, extend from the solenoid valve operating circuit 76. More specifically, the common line 78 is a signal line (e.g., a ground line) in common with the solenoid valve units 72, and the signal lines 80 to 94 are signal lines allocated to the respective solenoid valve units 72.

On the other hand, the solenoid valve units 72 are of substantially the same structure, and in each of the solenoid valve units 72, there are provided an individual solenoid valve 96, a common line 98, and signal lines 100 to 114, which are the same in number as the number of signal lines 80 to 94. One terminal of the solenoid valve 96 is connected to the signal line 100, whereas the other terminal is connected to the common line 98. Further, in each of the solenoid valve units 72, the signal lines 100 to 114 are configured such that the downstream side of each signal line in the connection direction is shifted stepwise by one line in a transverse direction with respect to the upstream side in the connection direction.

Owing thereto, in the case that the solenoid valve units 72 are connected in series with respect to the solenoid valve control unit 70, the common line 78 and the common lines 98 are connected in series, whereas with respect to the signal lines 80 to 94, which are allocated to the respective solenoid valve units 72, the signal lines 100 to 114 are connected in a stepwise manner.

In addition, with the solenoid valve control device 68 according to the comparative example, based on control signals supplied from the solenoid valve control circuit 74, the solenoid valve operating circuit 76 supplies output signals to the solenoid valves 96 via the respective signal lines 80 to 94 and the respective signal lines 100 to 114, thereby controlling operating of the respective solenoid valves 96.

However, in the case of the comparative example, one of the signal lines 80 to 94 is allocated with respect to (one solenoid valve 96 that makes up) an individual solenoid valve unit 72, and in each of the solenoid valve units 72, signal lines 100 to 114 are provided, the number of the signal lines 100 to 114 being the same as the number of the signal lines 80 to 94.

More specifically, as shown in FIG. 2, in the event that operating of eight solenoid valves 96 is to be controlled, with the solenoid valve control unit 70, it is necessary for eight signal lines 80 to 94 plus one common line 78 equaling a total of nine signal lines to be provided. Further, in each of the solenoid valve units 72, it is necessary for eight signal lines 100 to 114 plus one common line 98 equaling a total of nine signal lines to be provided.

For this reason, when the number of solenoid valves 96 to be controlled (i.e., the number of solenoid valve units 72 including the solenoid valves 96) is increased, the number of signal lines must be increased remarkably, and ease of assembly of the solenoid valve units 72 is adversely affected.

In contrast thereto, with the solenoid valve control device 10 according to the present embodiment, as shown in FIG. 1, the solenoid valve operating circuits 44a to 44d are installed respectively in the solenoid valve blocks 14a to 14d in which plural solenoid valves 42a to 42d are provided in the form of a manifold. As a result, the solenoid valves 42a to 42d and the solenoid valve operating circuits 44a to 44d are aggregated together in respective block units. Owing thereto, with the present embodiment, an increase in the number of signal lines (serial communication lines 28 to 32, block selection lines 34 to 40) can be suppressed, and a greater number of solenoid valves 42a to 42d can be controlled.

More specifically, each of the block selection lines 34 to 40 is connected with the transfer line 56a to 56d of any one of the solenoid valve blocks 14a to 14d. In this case, for example, if a block selection signal is supplied from the solenoid valve control unit 12 to a solenoid valve operating circuit 44a to 44d of one of the solenoid valve blocks 14a to 14d via a corresponding one of the block selection lines 34 to 40 and a corresponding one of the transfer lines 56a to 56d, all of the solenoid valves 42a to 42d connected to the concerned solenoid valve operating circuit 44a to 44d are capable of being operated thereby. Further, if one block selection line 34 to 40 is added each time that an additional solenoid valve block 14a to 14d is connected, the additional solenoid valve block 14a to 14d in addition to the existing solenoid valve blocks can easily be controlled from the solenoid valve control unit 12.

As a result, with the present embodiment, even if the solenoid valves 42a to 42d to be controlled are increased significantly, since the number of signal lines is not increased so much, ease of assembly of the solenoid valve blocks 14a to 14d can be improved.

To explain in greater detail, in the solenoid valve control device 68 according to the comparative example shown in FIG. 2, in order to control operating of eight solenoid valves 96, the solenoid valve control unit 70 requires eight signal lines 80 to 94 plus one common line 78 equaling a total of nine signal lines. Further, in each of the solenoid valve units 72 as well, it is necessary for eight signal lines 100 to 114 plus one common line 98 equaling a total of nine signal lines to be provided.

Accordingly, as a tentative example, in the case that the solenoid valve control device 68 were used to control thirty-two individual solenoid valves as shown in FIG. 1, in the solenoid valve control unit 70, it would be necessary for thirty-two signal lines plus one common line equaling a total of thirty-three signal lines to be provided. On the other hand, in each of the solenoid valve units 72, it would be necessary for thirty-two signal lines plus one common line equaling a total of thirty-three signal lines to be provided.

In contrast thereto, as shown in FIG. 1, in the solenoid valve control device 10 according to the present embodiment, the solenoid valve operating circuits 44a to 44d are incorporated respectively in the solenoid valve blocks 14a to 14d. For this reason, even in the case that operating of thirty-two individual solenoid valves 42a to 42d is controlled, with the solenoid valve control unit 12, such a control can be completed with a total of nine signal lines, made up of the two power supply lines 24, 26, the three serial communication lines 28 to 32, and the four block selection lines 34 to 40. Further, in each of the solenoid valve blocks 14a to 14d as well, the configuration thereof can be consummated with a total of nine signal lines, made up of the two block-side power source lines 46a to 46d, 48a to 48d, the three block-side communication lines 50a to 50d, 52a to 52d, 54a to 54d, and the four transfer lines 56a to 56d, 58a to 58d, 60a to 60d, 62a to 62d.

Accordingly, with the solenoid valve control device 10 according to the present embodiment, in relation to the example shown in FIG. 1, the number of signal lines can be reduced to less than ⅓ of the number of signal lines in the solenoid valve control device 68 according to the comparative example of FIG. 2.

Further, with the present embodiment, it is possible to operate only the plural solenoid valves 42a to 42d that are connected to solenoid valve operating circuits 44a to 44d of the solenoid valve blocks 14a to 14d that are supplied with block selection signals. For this reason, compared to the technique disclosed in Japanese Laid-Open Patent Publication No. 06-123374, the response characteristics of the concerned plurality of solenoid valves 42a to 42d can easily be enhanced.

Further, the solenoid valve blocks 14a to 14d have substantially the same structure, and the block selection lines 34 to 40 and the transfer lines 56a to 56d, 58a to 58d, 60a to 60d, 62a to 62d are arranged in a so-called window-blinds like configuration (i.e., horizontal-stripes like configuration). Owing thereto, when the solenoid valve blocks 14a to 14d are connected sequentially in the connection direction with respect to the solenoid valve control unit 12, the respective block selection lines 34 to 40 and the respective transfer lines 56a to 56d, 58a to 58d, 60a to 60d, 62a to 62d are connected to each other. Consequently, ease of assembly of the solenoid valve blocks 14a to 14d is further improved. Further, since the solenoid valve blocks 14a to 14d have substantially the same structure, an operator is capable of assembling (connecting) the solenoid valve blocks 14a to 14d without any consideration as to the order in which the solenoid valve blocks are connected.

In addition, when the solenoid valve blocks 14a to 14d are connected in series with respect to the solenoid valve control unit 12 in the connection direction, all of the signal lines pertaining to supply of power (i.e., the power supply line 24 and the block-side power source lines 46a to 46d, the power supply line 26 and the block-side power source lines 48a to 48d) are connected in series. Further, all of the signal lines pertaining to serial communications (i.e., the serial communication line 28 and the block-side communication lines 50a to 50d, the serial communication line 30 and the block-side communication lines 52a to 52d, the serial communication line 32 and the block-side communication lines 54a to 54d) also are connected in series. Furthermore, all of the signal lines pertaining to transmission of the block selection signals (i.e., the block selection lines 34 to 40 and the transfer lines 56a to 56d, 58a to 58d, 60a to 60d, 62a to 62d) also are connected in series. As a result, ease of assembly of the respective solenoid valve blocks 14a to 14d can be further enhanced, and as for the device overall, a greater number of solenoid valves 42a to 42d can be controlled with a fewer number of signal lines.

The solenoid valve control device according to the present invention is not limited to the above embodiment. Various changes and modifications may be made to the embodiment without departing from the scope of the invention as set forth in the appended claims.

What is claimed is:

1. A solenoid valve control device equipped with a plurality of solenoid valve blocks arranged in the form of a manifold, and a solenoid valve control unit for controlling the solenoid valve blocks, wherein:
   the solenoid valve blocks are connected to the solenoid valve control unit;
   the solenoid valve control unit includes a power supply line for performing supply of power to the solenoid valve blocks, a serial communication line for carrying out serial communications among the solenoid valve blocks, and block selection lines provided in the same number as the solenoid valve blocks;
   each of the solenoid valve blocks includes a plurality of solenoid valves, a solenoid valve operating circuit that operates the solenoid valves, and transfer lines;
   the solenoid valve operating circuit of each of the solenoid valve blocks is connected to any one of the block selection lines via one of the transfer lines within the same block;
   the solenoid valve control unit supplies a block selection signal for selecting a given solenoid valve block to be controlled, to the solenoid valve operating circuit of the given solenoid valve block to be controlled, via any one of the block selection lines and the transfer lines for the given solenoid valve block to be controlled, which are connected to the one of the block selection lines; and
   based on the block selection signal, the solenoid valve operating circuit to which the block selection signal is supplied operates the plurality of solenoid valves that are connected to that solenoid valve operating circuit.

2. The solenoid valve control device according to claim 1, wherein:

the solenoid valve blocks are connected in series with respect to the solenoid valve control unit, and each of the solenoid valve blocks includes the same number of transfer lines as the number of the block selection lines;

the block selection lines are arranged along a direction transverse to the connection direction of the solenoid valve blocks;

the transfer lines of each of the solenoid valve blocks are arranged along the direction transverse to the connection direction, such that a downstream side of each transfer line in the connection direction is shifted stepwise by one line along the transverse direction with respect to an upstream side thereof in the connection direction;

the transfer lines of a first solenoid valve block adjacent to the solenoid valve control unit in the connection direction are connected to the respective block selection lines; and the transfer lines of each of second and subsequent solenoid valve blocks in the connection direction are connected to the respective transfer lines of an adjacent solenoid valve block on an upstream side in the connection direction, and to the respective transfer lines of an adjacent solenoid valve block on a downstream side in the connection direction.

3. The solenoid valve control device according to claim 2, wherein:

each of the solenoid valve blocks further includes a block-side power source line and a block-side communication line;

the solenoid valve operating circuit of each of the solenoid valve blocks is connected to the block-side power source line and the block-side communication line of the same block;

the block-side power source lines of the solenoid valve blocks are connected sequentially to the power supply line along the connection direction; and the block-side communication lines of the solenoid valve blocks are connected sequentially to the serial communication line along the connection direction.

* * * * *